United States Patent
Nunnelley

(10) Patent No.: US 6,778,343 B2
(45) Date of Patent: *Aug. 17, 2004

(54) METHOD, APPARATUS AND STORAGE SYSTEM HAVING STORAGE MEDIA WITH DIFFERENT TRACK PITCH BASED UPON A WIDTH OF A WRITE ELEMENT ASSOCIATED THEREWITH

(75) Inventor: Lewis L. Nunnelley, San Jose, CA (US)

(73) Assignee: Hitachi Global Storage Technologies Netherlands BV (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,610

(22) Filed: Mar. 25, 1998

(65) Prior Publication Data

US 2003/0133217 A1 Jul. 17, 2003

(51) Int. Cl.$^7$ .............................. G11B 27/36; G11B 5/09; G11B 20/20; G11B 5/596
(52) U.S. Cl. ........................ 360/31; 360/76; 360/78.04; 360/48
(58) Field of Search ........................... 360/31, 75, 76, 360/77.02, 78.01, 78.04, 48

(56) References Cited

U.S. PATENT DOCUMENTS

| | | | |
|---|---|---|---|
| 4,945,427 A | 7/1990 | Cunningham | 360/75 |
| 4,969,137 A | 11/1990 | Sugiyama et al. | 369/32 |
| 4,995,025 A | 2/1991 | Schulze | 369/32 |
| 5,079,661 A | 1/1992 | Iwanaga | 360/106 |
| 5,091,808 A | 2/1992 | Nigam | 360/78.05 |
| 5,119,248 A | 6/1992 | Bizjak et al. | 360/75 |
| 5,270,991 A | 12/1993 | Verboom | 369/44.26 |
| 5,285,341 A | 2/1994 | Suzuki et al. | 360/121 |
| 5,416,758 A | 5/1995 | Ito | 369/44.28 |
| 5,581,420 A * | 12/1996 | Chainer et al. | 360/77.08 X |
| 5,940,250 A * | 8/1999 | McNeil et al. | 360/246.6 |
| 6,005,725 A * | 12/1999 | Emo et al. | 360/31 |
| 6,005,743 A * | 12/1999 | Price et al. | 360/75 |

* cited by examiner

Primary Examiner—Andrew L. Sniezek
(74) Attorney, Agent, or Firm—Crawford Maunu PLLC

(57) ABSTRACT

A method and apparatus is disclosed for providing a track pitch on a recording surface that is associated with the width of the tracks written by the write element of a head therefore reducing the number of heads that are discarded when a fixed relationship between track pitch of storage media in a storage device is desired. The method includes the steps of calculating the width of a write element to be associated with a storage medium and determining the track pitch for the storage medium based upon the calculated width of the write element. The step calculation of the width of the read/write element includes writing a pattern on a storage medium at a predetermined radius using the write element associated with the storage medium to form a written track, moving the head across the written track to read an amplitude sensed from the written track by the head, and ascertaining the width of the write element based upon the sensed amplitude. Ascertaining the width of the write element includes the steps of determining the amplitude of the sensed signal, identifying a one-half amplitude point on a rising edge of the sensed signal and a one-half amplitude point at a falling edge of the sensed signal and computing the distance between the two points. The pattern written on the storage medium may be a constant frequency pattern. The determined track pitch for the storage medium based upon the width of the write element may also account for different skew angles of the head as the head is positioned from inner-diameters to outer-diameters. Thus, the track pitch may be allowed to decrease or increase from the inner-diameters to the outer-diameters in accordance with the skew angle of the head.

25 Claims, 6 Drawing Sheets

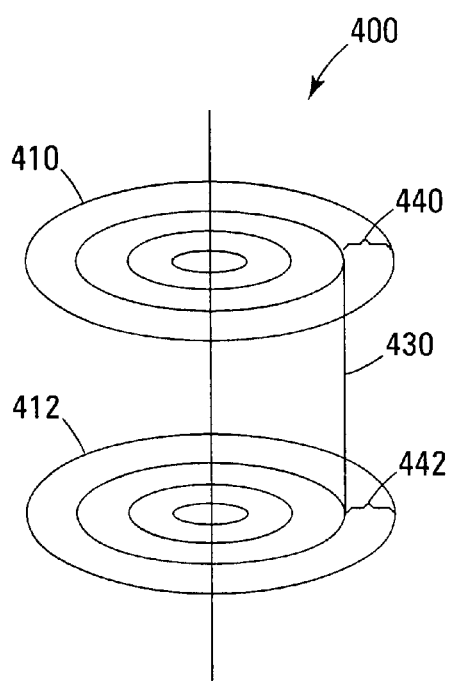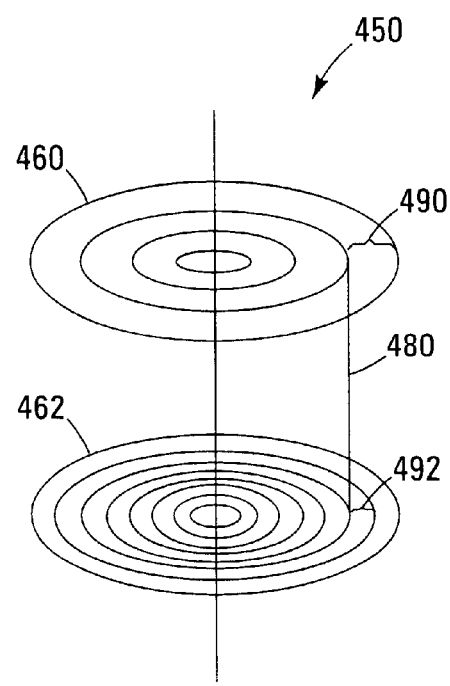
Fig. 4A
Prior Art
Fig. 4B

METHOD, APPARATUS AND STORAGE SYSTEM HAVING STORAGE MEDIA WITH DIFFERENT TRACK PITCH BASED UPON A WIDTH OF A WRITE ELEMENT ASSOCIATED THEREWITH

BACKGROUND OF THE INVENTION

1. Field of the Invention

This invention relates in general to a disk drives, and more particularly to disk drives having tracks spaced apart according to the width of the written track.

2. Description of Related Art

Variations in track pitch due to the orientation of the head through the arcing motion of the support arm are well known. FIG. 1 illustrates a head 110 flying over a plurality of tracks 112, 114 on a recording medium 120. In FIG. 1, the recording head 110 is generally centered over a first track 112. The track pitch 130 is the distance between the centerline 132 of the first track 112 and the centerline 134 of the second track 114. Variations in the track pitch 130 due to the orientation of the head 110 through the arcing motion of the support arm are well known. In fact, in a conventional disk drive with a sector servo system the track pitch typically varies from inner-diameter (ID) to outer-diameter (OD). This is because using a rotary actuator causes a different skew angle of the recording head from ID to OD. Common skew angles may vary several degrees from the ID to the OD. Because of this skew angle the track pitch at ID is typically about 4% higher than the track pitch at the OD.

However, each recording surface in all conventional disk drives with a sector servo system and two or more recording surfaces have the same track pitch at a given radius. Since the skew angle of the head varies from ID to OD, the track pitch may be selected to be less at the outer-diameters. Still, the track pitch is the same at the same radius on different disk surfaces.

The dimensional tolerance of the written track depends mostly on the dimensional tolerance of the width of the writing element of the recording head. Minor effects on the width of the written track include the medium coercivity and magnetic spacing. The dimensional tolerance of the writing element width depends mostly on the photolithographic processes used to make the recording head. Over the past few years, the size of magnetic heads have continued to decrease. While the size of magnetic heads continue to decrease, the tolerance for processing magnetic heads is not decreasing as fast as the desired nominal width of the head. As a consequence, the ratio of the tolerance to the nominal value of the write head is increasing with each new disk drive product having higher areal density. As a result, heads having significant variation in width are produced. To accommodate the track pitch spacing design, heads must be sorted to select those which will allow the desired track pitch. Further, due to the relatively poor tolerance of the photolithographic processes used to make the recording head, heads that do not meet the given track pitch have to be discarded.

It can be seen that there is a need for a method and apparatus for providing a track pitch on a recording surface that is determined by the width of the tracks written by the head for the recording surface.

It can be seen that there is a need for a method and apparatus for providing a disk drive having a track pitch that varies form recording surfaces due to the width of the write element so that heads need not be sorted to achieve a fixed track pitch relationship between each recording media in a disk drive.

SUMMARY OF THE INVENTION

To overcome the limitations in the prior art described above, and to overcome other limitations that will become apparent upon reading and understanding the present specification, the present invention discloses a disk drive having tracks spaced apart according to the width of the written track.

The present invention solves the above-described problems by providing a method and apparatus for providing a track pitch on a recording surface that is determined by the width of the tracks written by the head for the recording surface therefore eliminating the need to discard unmatched heads as required when a fixed relationship of the track pitch between different storage media in a storage device is desired.

A method in accordance with the principles of the present invention includes the steps of calculating the width of a write element to be associated with a storage medium and determining the track pitch for the storage medium based upon the calculated width of the write element.

Other embodiments of a system in accordance with the principles of the invention may include alternative or optional additional aspects. One such aspect of the present invention is that the step of calculating the width of the write element further comprises the steps of writing a pattern on a storage medium at a predetermined radius using the write element associated with the storage medium to form a written track, moving the head across the written track to read an amplitude sensed from the written track by the head element, and ascertaining the width of the write element based upon the sensed amplitude.

Another aspect of the present invention is that the step of ascertaining the width of the write element comprises the steps of determining the amplitude of the sensed signal, identifying a one-half amplitude point on a rising edge of the sensed signal and a one-half amplitude point at a falling edge of the sensed signal and computing the distance between the two points.

Another aspect of the present invention is that the pattern written on the storage medium further comprises a constant frequency pattern.

Yet another aspect of the present invention is that the step of determining the track pitch for the storage medium further comprises the step of adjusting the determined track pitch for the storage medium based upon the width of the write element to account for different skew angles of the head as the head is positioned from inner-diameters to outer-diameters.

Another aspect of the present invention is that the skew angle increases as the head is positioned from the inner-diameters to the outer-diameters allowing the track pitch to decrease from the inner-diameters to the outer-diameters.

Another aspect of the present invention is that the skew angle decreases as the head is positioned from the inner-diameters to the outer-diameters allowing the track pitch to decrease from the outer-diameters to the inner-diameters.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 4A and 4B illustrate the difference between a prior art storage device and a storage device having different track pitch for each storage medium according to the width of the write element;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides recording media having tracks spaced apart according to the width of the written track. The invention provides a method and apparatus for providing a track pitch on a recording surface that is associated with the width of the tracks written by the head for each specific recording surface and thus provides a variable track pitch on a recording surface that reduces the number of heads that are discarded.

Figure 1:
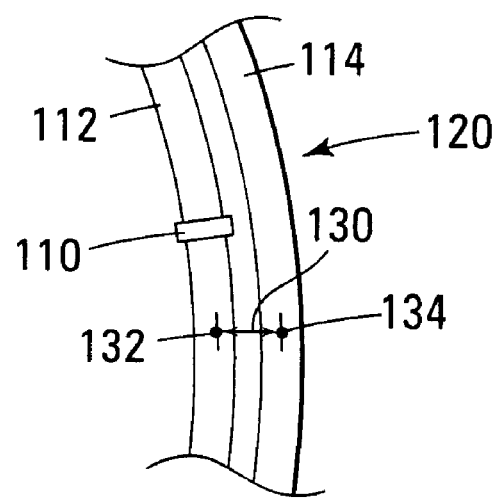
FIG. 1 illustrates a head flying over a plurality of tracks on a recording medium.
Figure 2:
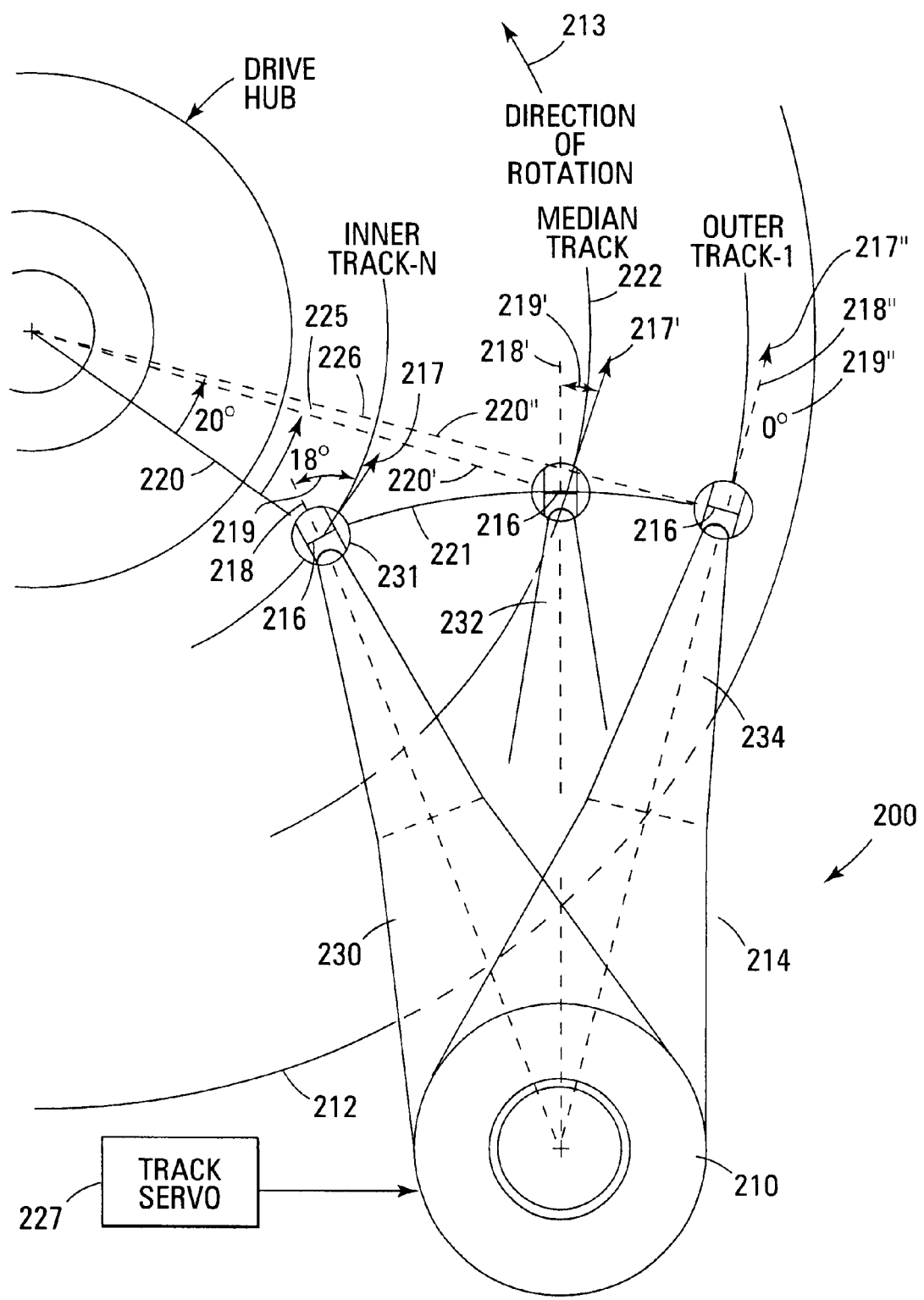
FIG. 2 illustrates the operation of a disk drive system including an actuator arm for moving the recording head relative to the recording media.

FIG. 2 illustrates the operation of a disk drive system 200. In FIG. 2, the disk drive 200 includes an actuator arm 210 for moving the recording head 231 relative to the recording media 212. The recording head 231 is moved in an arc 221 by virtue of operation of a rotary actuator 210. Accordingly, tracks of decreasing track width from the disk's outer track-1 to its inner track-N, are provided wherein the track-to-track spacing increases, from the disk's inner track-N to its outer track-1.

A portion of a magnetic recording disk is shown at 212. The disk is rotated counter-clockwise, see arrow 213, at a substantially constant angular velocity by means of a drive motor, not shown. Rotary actuator 210 includes an actuator arm 214 that is bidirectionally movable through a limited arc, for example 35 degrees. Head 231 and a head suspension means (not shown) are mounted on arm 214. FIG. 2 shows the generally linear gap 216 of head 231. The physical dimensions of gap 216 are greatly exaggerated in FIG. 2.

Actuator arm 214 is shown in three of its numerous operating positions. Position 230 is the position that arm 214 occupies when transducing the disk's inner track-N; position 232 is the position the arm occupies when transducing the disk's median track 222; and position 234 is the arm's position when transducing outer track-1. Arm 214 rotates through an arc of predetermined dimensions when moving from the disk's inner track-N to the disk's outer track-1.

Arrow 217 identifies the tangential velocity vector line of the disk's rotational velocity at the location of the disk's inner track-N. Dotted line 218 is a line that passes through the center of gap 216 and is perpendicular to the gap. Numerals 217', 217'', 218' and 218'' identify corresponding parameters at the location of the disk's median track 222 and its outer track-1.

As can be seen from FIG. 2, gap 216 is rotated or skewed clockwise relative to vectors 217, 217', 217'' by an angle identified as 219, 219', 219''. The disk radii at track-N, at median track 222, and at track-1 is identified at 220, 220, '220'', respectively.

Actuator 210 bidirectionally moves head 231 and its gap 216 along an arc 221 that is non-radial of disk 212. As can be seen from FIG. 2, the projection of gap 216 onto disk radii 220, 220', 220'' results in an inner track-N, a median track 222, and an outer track-1 whose width is always less than the length of gap 216, and whose width progressively decreases from the disk's outer track-N to its inner track-1. The construction and arrangement of this invention by which gap skew changes with head movement is such that the disk's track width progressively decreases, from the disk's outer track to its inner track. The exemplary counter-clockwise direction of disk rotation, or clockwise direction of gap skew change or rotation relative to the disk radii, and/or geometric characteristics of the actuator arm rotation and head displacement are not to be taken as a limitation on the present invention.

In this exemplary showing, at median track 222, gap skew angle 219' has increased. At track-1, skew angle 219'' has again decreased, and the skew angle is at its minimum value. It should be noted that the skew angle has decreased in the same sense, in this case clockwise, and the skew angle has not passed through zero, but may in fact reach zero. When these skew angles are projected on disk radii 220, 220' and 220'', respectively, it can be seen that the track width progressively increases from track-N, to the median track, to track-1.

Thus, a disk drive with a sector servo system includes a recording medium wherein the track pitch varies from inner-diameter (ID) to outer-diameter (OD). However, all conventional disk drives with two or more recording surfaces have the same track pitch at a given radius. Nevertheless, the dimensional tolerance of the written track depends mostly on the dimensional tolerance of the width of the writing element of the recording head. As track densities increase, the width of the recording head must be decreased accordingly. The dimensional tolerance of the writing element width depends mostly on the photolithographic processes used to make the recording head. However, photolithographic tolerance is not decreasing as fast as the desired nominal width of the head required for the desired track density. As a consequence, the ratio of the photolithographic tolerance to the nominal value of the write head is increasing with each new disk drive product having higher areal density. As a result, heads having significant variation in width are produced. To maintain the track spacing at a given radius, all the heads for the storage device must have the same width within tolerances less than currently being provided by the photolithographic processes. Thus, the heads must be sorted to identify those heads which satisfy the required head width tolerance so that only those heads that allow the consistent track spacing are used in a drive system. This process adds an unnecessary step in the assembly process and results in the discarding of some heads. Both drawbacks could be eliminated if the recording medium utilized tracks spaced apart according to the width of the written track.

Figure 3:
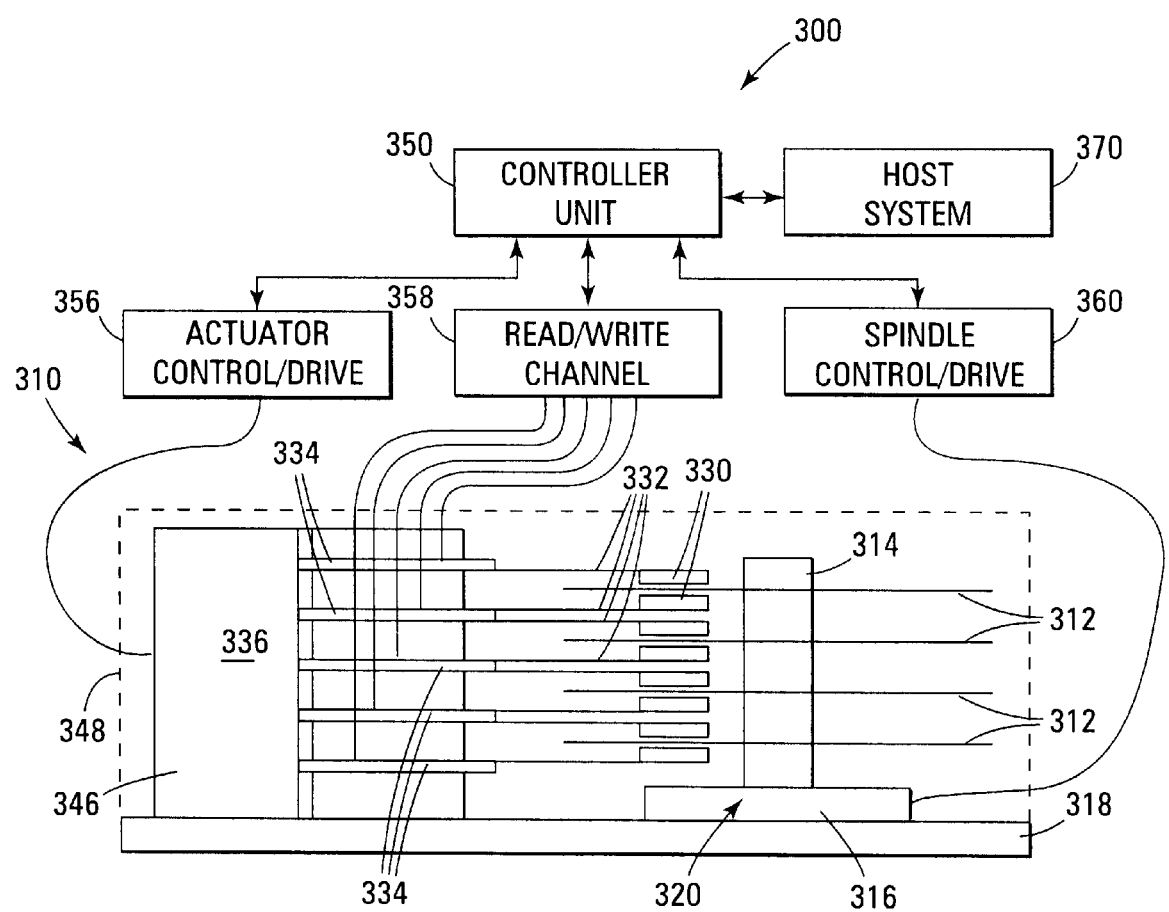
FIG. 3 shows a schematic diagram of a data storage system of the present invention.

FIG. 3 shows a schematic diagram of a data storage system of the present invention that is designated by the general reference number 300. System 300 includes a hardware plant 310. The hardware plant 310 comprises a disk assembly 320 and an actuator assembly 346. The disk assembly 320 includes a plurality of disks 312, a spindle 314, and a motor 316. Each disk has a plurality of concentric data tracks. Disks 312 are mounted on the spindle motor shaft 314 which is connected to the spindle motor 316. Motor 316 is mounted to a chassis 318.

The actuator arm assembly 346 includes a plurality of sliders 330 having a magnetic head positioned over each of the disks 312 such that each surface of the disks 312 has a corresponding slider 330. Each slider 330 is attached to one of the plurality of suspensions 332 which in turn are attached to an actuator arm 334.

The actuator arm assembly 346 is usually an integral part of a rotary actuator comb. As described with reference to FIG. 2, the actuator arm assembly 346 moves the heads in a radial direction across disks 312. Actuator arm assembly 346 is mounted to chassis 318. The actuator arm assembly 346 including sliders 330, suspensions 332, and arms 334. The disk stack assembly 320 and the actuator assembly 346 are sealed in an enclosure 348 (shown by dashed line) which provides protection from particulate contamination.

A controller unit 350 provides overall control to system 300. Controller unit 350 typically contains a central a processing unit (CPU), memory unit and other digital circuitry. Controller 350 is connected to an actuator control/drive unit 356 which in turn is connected to actuator 336. This allows controller 350 to control the movement of sliders 330 over disks 312. The controller 350 is connected to a read/write channel electronics 358 which in turn is connected to the heads of the sliders 330. This allows controller 350 to send and receive data from the disks 312. Controller 350 is also connected to a spindle control/drive unit 360 which in turn is connected to spindle motor 316. This allows controller 350 to control the rotation of disks 312.

A host system 370, which is typically a computer system, is connected to the controller unit 350. System 370 may send digital data to controller 350 to be stored disks 312, or may request that digital data be read from disks 312 and sent to the system 370.

FIGS. 4A and 4B illustrate the difference between a prior art storage device 400 and a storage device 450 having a different track pitch for each storage surface according to the width of the write element associated with each storage medium according to the present invention. In FIG. 4A, two storage media are shown, 410, 412. As illustrated in FIG. 4A, the track pitch, while possibly varying from ID to OD, is the same for each storage medium so that at a given radius 430 there is no difference between the track pitch 440 for the first storage medium 410 and the track pitch 442 for second storage medium 412.

In contrast, FIG. 4B illustrates a storage device 450 wherein, at a given radius 480, the first storage medium 460 has a track pitch 490 that is different than the track pitch 492 of the second storage medium. The track pitch 492, 494 for the first 460 and second 462 storage media illustrated in FIG. 4B is determined according to the width of the write element associated with each storage medium 460, 462.

Figure 5:
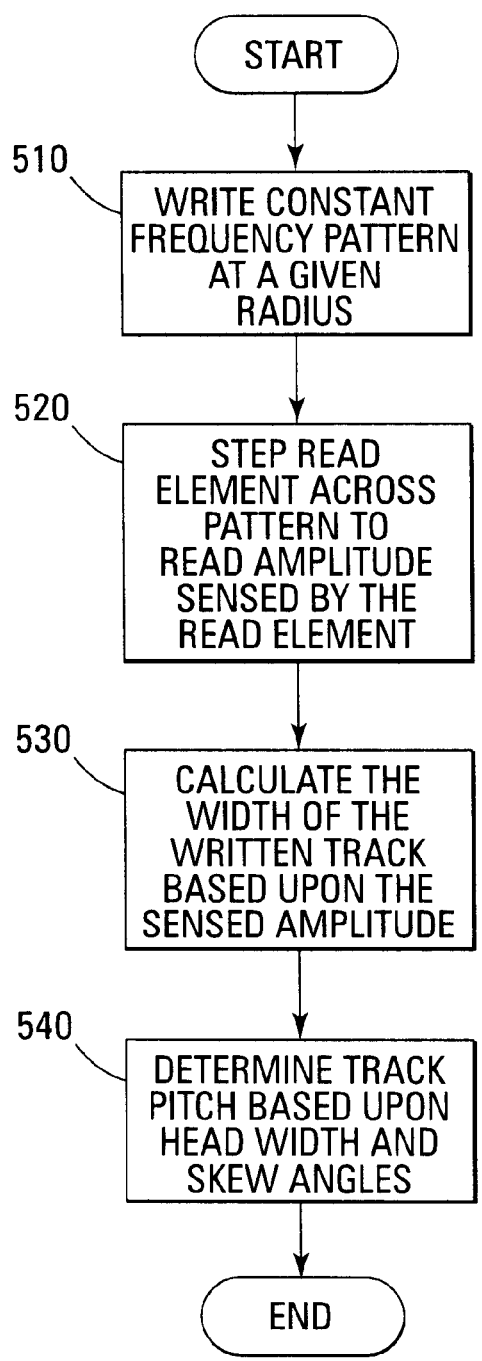
FIG. 5 illustrates a method for achieving the variable pitch rate according to the present invention.

FIG. 5 illustrates a method 500 for achieving the variable pitch rate according to the present invention. The present invention, provides different track pitch for each recording surface (compared at a fixed radius) depending on the width of the written track on that surface. Thus, the heads do not have to be sorted to maintain the same track spacing at a give radius. Further, the average track pitch per disk drive approaches the nominal value and thus the disk drive would have the target total capacity. An advantage to a recording medium utilizing the variable track pitch according to the present invention is that a much wider distribution of written track widths can be utilized in manufacturing the disk drive thereby greatly relaxing the requirement of narrow tolerances of the geometry of the recording head.

As shown in FIG. 5, once the disk drive is manufactured, the written trackwidth is determined by preferably writing a constant frequency pattern at a given radius 510. Then the read element is moved across (convolved with) the written track 520. The written track width is calculated by determining the distance between the two points having one-half of the maximum amplitude 530. See the discussion below with reference to FIG. 6 for a description of the width calculation. This written track width is then used in the servo write operation to establish the track pitch. After the target track pitch is determined, the normal effects due to skew angle are included in the track spacing from the inner-diameter to the outer-diameter 540.

Figure 6:
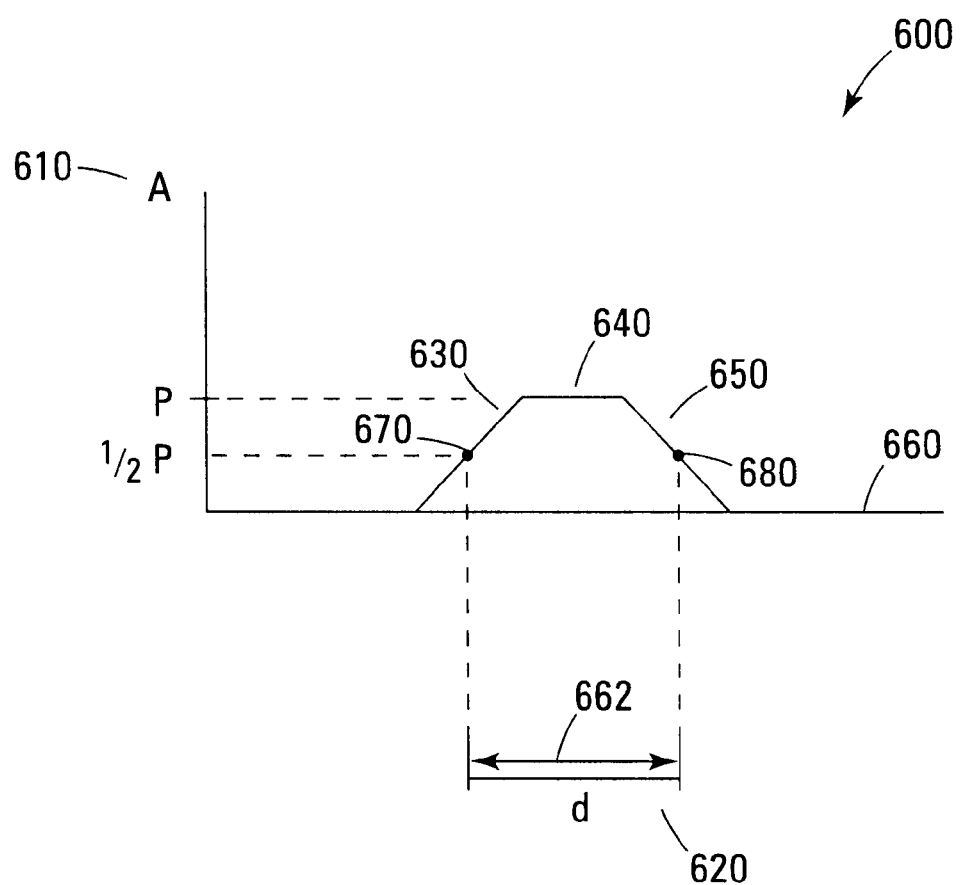
FIG. 6 illustrates a graph of the amplitude of the signal sensed by the head as it is moved across the written track.

FIG. 6 illustrates a graph 600 of the amplitude of the signal sensed by the head element as it is moved across the written track. The amplitude 610 is plotted relative to the radius position of the head 620. As the head is moved across the written track the amplitude 610 begins to increase 630 until a maximum value 640 is reached. As the head is continually moved across, the amplitude 610 begins to decrease 650 until no signal is detected, i.e., a minimum or nominal signal value 660. The width of the write element 662 is the distance from the one-half amplitude at the rising edge 670 of the sensed signal to the one-half amplitude point at the falling edge 680 of the sensed signal. Those skilled in the art will recognize that the plot is given for illustration purposes only, and that the width of the write element may be determined by other means, e.g., by storing samples of the sensed data in a register or memory until the one-half amplitude point on the rising edge of the sensed signal and the one-half amplitude point at the falling edge of the sensed signal have been determined and the distance between the two points ascertained.

Accordingly, the track pitch on the recording surface is associated with the width of the tracks written by the head. Thus, a different track pitch may be provided on each recording surface in a disk drive so that the discarding of heads due to the photolithographic process tolerances is eliminated.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a different track pitch for each storage medium of a storage device including plural storage mediums, comprising:

calculating for each storage medium the width of a written track generated by a write element of a magnetic head associated with one surface of said storage medium in said storage device; and determining the track pitch of the one surface for each medium based upon the calculated width of the written track as the angle of the write element associated therewith changes as the write element moves between the inner-diameter and the outer-diameter of the one surface for each medium.

2. The method of claim 1 wherein the calculating the width of the written track generated by the write element further comprises:

writing a pattern on the one surface of the storage medium at a predetermined radius using the write element associated with the one surface of the storage medium to form the written track;

moving the head across the written track to read an amplitude sensed from the written track by the head; and ascertaining the width of the write element based upon the sensed amplitude.

3. The method of claim 2 wherein the ascertaining the width of the written track generated by the write element comprises:

determining the amplitude of the sensed signal;

identifying a one-half amplitude point on a rising edge of the sensed signal and a one-half amplitude point at a falling edge of the sensed signal; and computing the distance between the two points.

4. The method of claim 2 wherein the pattern written on the storage medium further comprises a constant frequency patter.

5. The method of claim 1 wherein the determining the track pitch for the one surface of the storage medium further comprises adjusting the determined track pitch for the one surface of the storage medium based upon the width of the written track generated by the write element associated therewith to account for different skew angles of each head as each head is positioned from inner-diameters to outer-diameters.

6. The method of claim 5 wherein the skew angle increases as the head element is positioned from the inner-diameters to the outer-diameters allowing the track pitch to decrease from the inner-diameters to the outer-diameters.

7. The method of claim 5 wherein the skew angle decreases as the head is positioned from the inner-diameters to the outer-diameters allowing the track pitch to decrease from the outer-diameters to the inner-diameters.

8. A track pattern for a disk drive comprising:

a disk drive having a plurality of storage media wherein concentric data tracks are formed thereon, the pitch between the data tracks for one surface of each storage medium being determined by calculating for each medium the width of a written track as the angle of a write element associated with the one surface of the storage medium changes as the write element moves between the inner-diameter and the outer-diameter of the one surface of the storage medium.

9. The track pattern of claim 8 wherein the width of the written track generated by the write element comprises the distance between a one-half amplitude point on a rising edge of a signal sensed by the read/write element as the read/write element is moved across the data track and a one-half amplitude point at a falling edge of the signal.

10. The track pattern of claim 9 wherein the data track on the one surface of the storage medium for determining the width of the written track generated by the write element associated therewith further comprises a constant frequency pattern.

11. The track pattern of claim 10 wherein the track pitch for the one surface of the storage medium further Includes an adjustment accounting for different skew angles of a head as the head is positioned from inner-diameters to outer-diameters.

12. The track pattern of claim 11 wherein the skew angle increases as the head Is positioned from the inner-diameters to the outer-diameters allowing the track pitch to decrease from the inner-diameters to the outer-diameters.

13. The track pattern of claim 11 wherein the skew angle decreases as the head is positioned from the inner-diameters to the outer-diameters allowing the track pitch to decrease from the outer-diameters to the inner-diameters.

14. A storage device, comprising, an actuator assembly having a magnetic head disposed at a distal end of each of a plurality of actuator arms, each of the heads including a write element and the actuator arms pivoting about an axis at a proximal end;

a plurality of storage media wherein each of the plurality of storage media is in positional relationship with a head, wherein each storage medium includes variable pitched data tracks, the pitch between the data tracks of one surface of each storage medium being based upon a calculation of the width of a written track as the angle of a write element of a head associated with the one surface of the storage medium changes as the write element moves between the inner-diameter and the outer-diameter of the one surface of the storage medium;

a spindle, coupled to the plurality of storage media for supporting the plurality of storage media In positional relationship with a head; and a motor, coupled to the spindle, for rotating the plurality of storage media relative to a head.

15. The storage device of claim 14 wherein the width of the written track generated by the write element comprises the distance between a one-half amplitude point on a rising edge of a signal sensed by a head as the head is moved across the data track and a one-half amplitude point at a falling s edge of the signal.

16. The storage device of claim 15 wherein the data track on the one surface of a storage medium for determining the width of the written track generated by the write element further comprises a constant frequency pattern.

17. The storage device of claim 16 wherein the track pitch for the one surface of a storage medium further includes an adjustment accounting for different skew angles of a head as the head is positioned from inner-diameters to outer-diameters.

18. The storage device of claim 17 wherein the skew angle increases as the head is positioned from the inner-diameters to the outer-diameters allowing the track pitch to decrease from the inner-diameters to the outer-diameters.

19. The storage device of claim 17 wherein the skew angle decreases as the head is positioned from the inner-diameters to the outer-diameters allowing the track pitch to decrease from the outer-diameters to the inner-diameters.

20. A disk storage device, comprising a plurality of recording surfaces, wherein each recording surface comprises a plurality of concentric recording tracks, the width of at least one of the recording tracks on one of the recording surfaces at a given radius being different from the width of a recording track on the other recording surfaces at the given radius, the pitch between data tracks of each recording surface being determined by the track widths of each recording surface and based upon a calculation of the width of a written track as the angle of a write element associated with a recording surface changes as the write element moves between the inner-diameter and the outer-diameter of the recording surface.

21. A storage device, comprising:

an actuator assembly having a magnetic head disposed at a distal end of each of a plurality of actuator arms associated with the actuator assembly, each of the heads including a write element and the actuator arms pivoting about an axis at a proximal end;

a plurality of storage media, wherein each of the plurality of storage media is in a positional relationship with a head, wherein each storage medium includes variable pitched data tracks, the pitch between at least two of the data tracks on one storage medium at a given radius being different from the pitch between at least two data tracks on a surface of another of the plurality of storage media at the given radius, wherein the track pitch for a storage medium is determined based upon a calculation of the width of a written track generated by a write element associated with the storage medium and further includes an adjustment accounting for different skew angles of a head as the head is positioned from inner-diameters to outer-diameters of the storage medium;

a spindle, coupled to the plurality of storage media for supporting the storage media in positional relationship with a head; and is a motor, coupled to the spindle, for rotating the storage media relative to the head.

22. The storage device of claim 21 wherein the width of the written track generated by the write element comprises the distance between a one-half amplitude point on a rising edge of a signal sensed by a head as the head is moved across a data track and a one-half amplitude point at a falling edge of the signal.

23. The storage device of claim 22 wherein the data track on the storage medium for determining the width of the written track generated by the write element further comprises a constant frequency pattern.

24. The storage device of claim 21 wherein the skew angle increases as the head is positioned from the inner-diameters to the outer-diameters allowing the track pitch to decrease from the inner-diameters to the outer-diameters.

25. The storage device of claim 21 wherein the skew angle decreases as the head is positioned from the inner-diameters to the outer-diameters allowing the track pitch to decrease from the outer-diameters to the inner-diameters.

* * * * *

UNITED STATES PATENT AND TRADEMARK OFFICE
CERTIFICATE OF CORRECTION

PATENT NO. : 6,778,343 B2
DATED : August 17, 2004
INVENTOR(S) : Nunnelley

It is certified that error appears in the above-identified patent and that said Letters Patent is hereby corrected as shown below:

Column 3,
Line 9, "corresponding,parts" should read -- corresponding, parts --.

Column 4,
Lines 15 and 16, "220, 220,′220″," should read -- 220, 220', 220″, --
Line 23, "track-N to its inner track-1" should read -- track-1 to its inner track-N --.

Column 7,
Line 38, "patter" should read -- pattern --.

Column 8,
Line 10, "Includes" should read -- includes --.
Line 15, "Is" should read -- is --.
Line 39, "In" should read -- in --.
Line 47, "falling s" should read -- falling --.

Column 10,
Line 7, "is a motor" should read -- a motor --.

Signed and Sealed this

Fifteenth Day of February, 2005

JON W. DUDAS
*Director of the United States Patent and Trademark Office*